(12) United States Patent
Franco

(10) Patent No.: US 6,213,004 B1
(45) Date of Patent: Apr. 10, 2001

(54) PORTABLE BROILING DEVICE

(76) Inventor: Gene Franco, 6159 Adenmoor Ave., Lakewood, CA (US) 90713

( * ) Notice: Subject to any disclaimer, the term of this patent is extended or adjusted under 35 U.S.C. 154(b) by 0 days.

(21) Appl. No.: 09/691,723

(22) Filed: Oct. 18, 2000

Related U.S. Application Data

(60) Provisional application No. 60/169,648, filed on Dec. 8, 1999.

(51) Int. Cl.[7] ............................. A47J 37/00; A47J 37/04
(52) U.S. Cl. ......................... 99/421 H; 99/341; 99/419; 99/400; 99/427; 99/446; 99/448
(58) Field of Search ............................. 99/331, 339, 340, 99/341, 400, 401, 419–421 V, 427, 444–450, 481, 482; 126/25 R, 9 R, 41 R, 299 C, 369, 20; 219/400, 401, 403, 404, 385, 386, 440; 426/523, 466

(56) References Cited

U.S. PATENT DOCUMENTS

| | | | |
|---|---|---|---|
| 3,113,504 | * 12/1963 | Reed | 99/421 H |
| 3,247,827 | * 4/1966 | Cremer | 99/421 H |
| 3,733,999 | * 5/1973 | Bernstein | 99/339 X |
| 4,598,690 | * 7/1986 | Hsu | 126/25 R |
| 4,924,766 | * 5/1990 | Hitch | 99/421 HV |
| 5,007,403 | * 4/1991 | Chen | 219/401 |
| 5,195,425 | * 3/1993 | Koziol | 99/447 X |
| 5,333,540 | * 8/1994 | Mazzocchi | 99/450 X |
| 5,421,318 | * 6/1995 | Unruh et al. | 126/9 R |
| 5,536,518 | * 7/1996 | Rummel | 426/523 |
| 5,649,475 | * 7/1997 | Murphy et al. | 99/421 H |
| 5,819,639 | * 10/1998 | Spell | 99/446 X |
| 5,832,811 | * 11/1998 | King | 99/419 X |

* cited by examiner

Primary Examiner—Timothy F. Simone
(74) Attorney, Agent, or Firm—Goldstein & Canino

(57) ABSTRACT

A broiling device including a housing having a generally rectangular configuration. The housing has an open upper end, a closed lower end, a front wall, a rear wall, and opposed side walls. The front wall and the rear wall each have a pair of upper and lower support tabs extending inwardly from inner surfaces thereof to support grilling grates thereon. The opposed side walls each have corresponding upper and lower apertures therethrough. A dome-shaped lid is hingedly coupled with the open upper end of the housing. A heating element is disposed within an interior surface of the dome-shaped lid. A handled skewer selectively extends between the upper and lower apertures of the opposed side walls of the housing.

8 Claims, 2 Drawing Sheets

PORTABLE BROILING DEVICE

CROSS REFERENCES AND RELATED SUBJECT MATTER

This application relates to subject matter contained in provisional patent application Ser. No. 60/169,648, filed in the United States Patent & Trademark Office on Dec. 8, 1999.

BACKGROUND OF THE INVENTION

The present invention relates to a portable broiling device and more particularly pertains to providing heat from above food items so as to properly cook the food items.

Today's health conscious society is always seeking healthier methods of preparing foods. Frying and baking are usually seen as less than healthy preparation methods. The use of outdoor grills provides heat from below the food. Charcoal that is used in these grills tend to emit carcinogens that can be trapped in the foods. The only remaining healthy cooking alternative involves broiling. Most broiling is done indoors in an oven. What is needed is a device that will allow for broiling outdoors such that heat can be directed downwardly on the food items that are being cooked.

The present invention attempts to solve the abovementioned problem by providing a device that will enable outdoor broiling, while providing additional cooking variations to allow food items to be properly cooked.

The use of barbeque devices is known in the prior art. More specifically, barbeque devices heretofore devised and utilized for the purpose of cooking food are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,628,897 to Stanfa discloses a gas broiler for outdoor use comprised of a cooking rack below ceramic burner blocks. U.S. Pat. No. 4,598,634 to Va Horn II discloses a portable broiler apparatus and grease tray utilized with a cooking range. U.S. Pat. No. 5,036,180 to Scott discloses a grill that simulates a broiler, for use indoors.

While these devices fulfill their respective, particular objective and requirements, the aforementioned patents do not describe a portable broiling device for providing heat from above food items so as to properly cook the food items.

In this respect, the portable broiling device according to the present invention substantially departs from the conventional concepts and designs of the prior art, and in doing so provides an apparatus primarily developed for the purpose of providing heat from above food items so as to properly cook the food items.

Therefore, it can be appreciated that there exists a continuing need for a new and improved portable broiling device which can be used for providing heat from above food items so as to properly cook the food items. In this regard, the present invention substantially fulfills this need.

SUMMARY OF THE INVENTION

In the view of the foregoing disadvantages inherent in the known types of barbeque devices now present in the prior art, the present invention provides an improved portable broiling device. As such, the general purpose of the present invention, which will be described subsequently in greater detail, is to provide a new and improved portable broiling device and method which has all the advantages of the prior art and none of the disadvantages.

To attain this, the present invention essentially comprises a housing having a generally rectangular configuration. The housing has an open upper end, a closed lower end, a front wall, a rear wall, and opposed side walls. The closed lower end has a plurality of legs extending downwardly therefrom. The front wall and the rear wall each have a pair of upper and lower support tabs extending inwardly from inner surfaces thereof to support grilling grates thereon. The front wall has a slotted opening therein upwardly of the closed lower end. The slotted opening removably receives a drip pan therein. The opposed side walls each have corresponding upper and lower apertures therethrough. A dome-shaped lid is hingedly coupled with the open upper end of the housing. The lid has a clear window disposed within a forward portion thereof. A heating element is disposed within an interior surface of the dome-shaped lid. The heating element has a temperature control mechanism disposed outwardly with respect to the lid. The heating element has a power cord extending outwardly therefrom for coupling with an electrical outlet. A handled skewer selectively extends between the upper and lower apertures of the opposed side walls of the housing. A free end of the skewer has a motor coupled thereto. The skewer includes a pair of inwardly extending forks removably coupled thereto.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved portable broiling device which has all the advantages of the prior art barbeque devices and none of the disadvantages.

It is another object of the present invention to provide a new and improved portable broiling device which may be easily and efficiently manufactured and marketed.

It is a further object of the present invention to provide a new and improved portable broiling device which is of durable and reliable construction.

An even further object of the present invention is to provide a new and improved portable broiling device which is susceptible of a low cost of manufacture with regard to both materials and labor, and which accordingly is then susceptible of low prices of sale to the consuming public, thereby making such a portable broiling device economically available to the buying public.

Even still another object of the present invention is to provide a new and improved portable broiling device for providing heat from above food items so as to properly cook the food items.

Lastly, it is an object of the present invention to provide a new and improved portable broiling device including a housing having a generally rectangular configuration. The housing has an open upper end, a closed lower end, a front wall, a rear wall, and opposed side walls. The front wall and the rear wall each have a pair of upper and lower support tabs extending inwardly from inner surfaces thereof to support grilling grates thereon. The opposed side walls each have corresponding upper and lower apertures therethrough. A dome-shaped lid is hingedly coupled with the open upper end of the housing. A heating element is disposed within an interior surface of the dome-shaped lid. A handled skewer selectively extends between the upper and lower apertures of the opposed side walls of the housing.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various figures.

DESCRIPTION OF THE PREFERRED EMBODIMENT

Figure 1:
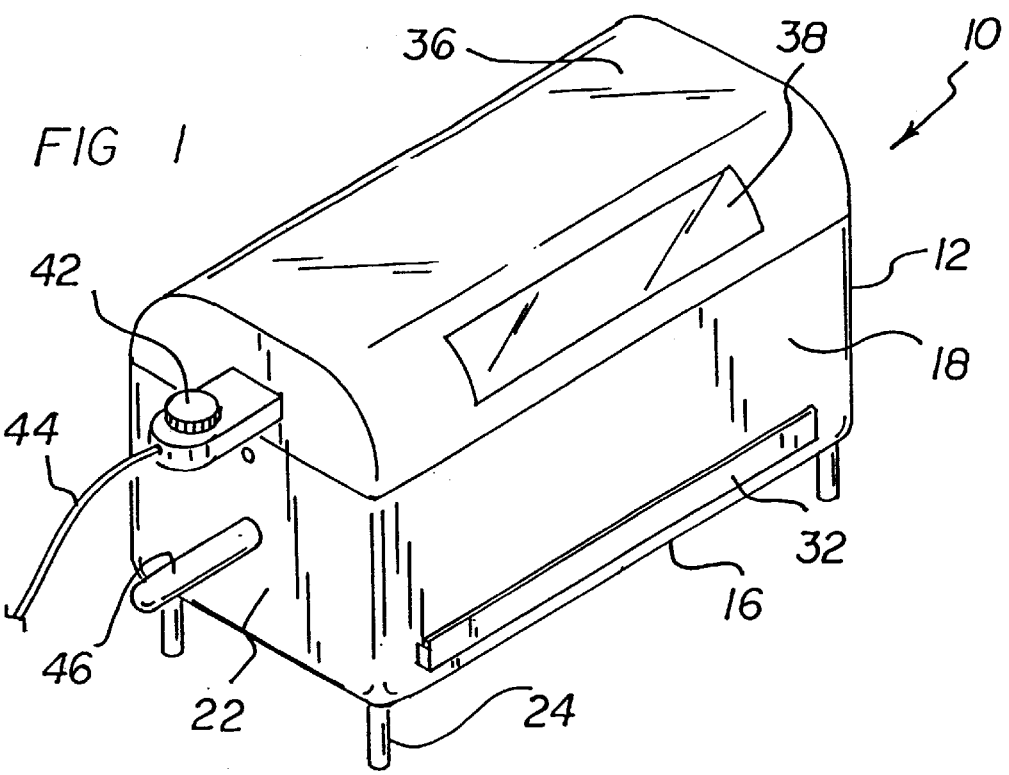
FIG. 1 is a perspective view of the preferred embodiment of the portable broiling device constructed in accordance with the principles of the present invention.
Figure 2:
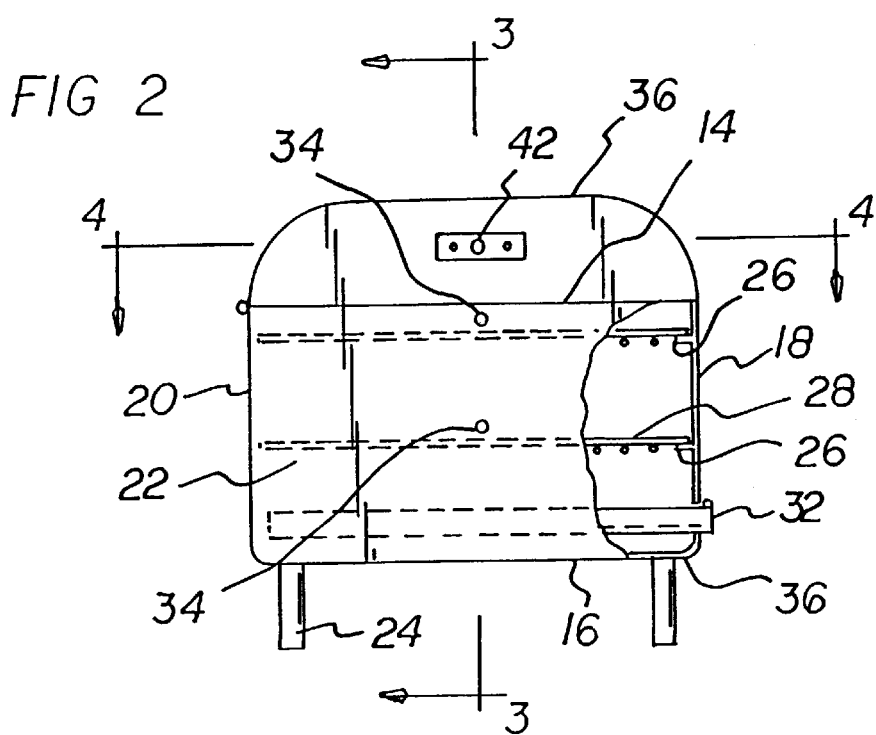
FIG. 2 is a side elevation view of the present invention.
Figure 3:
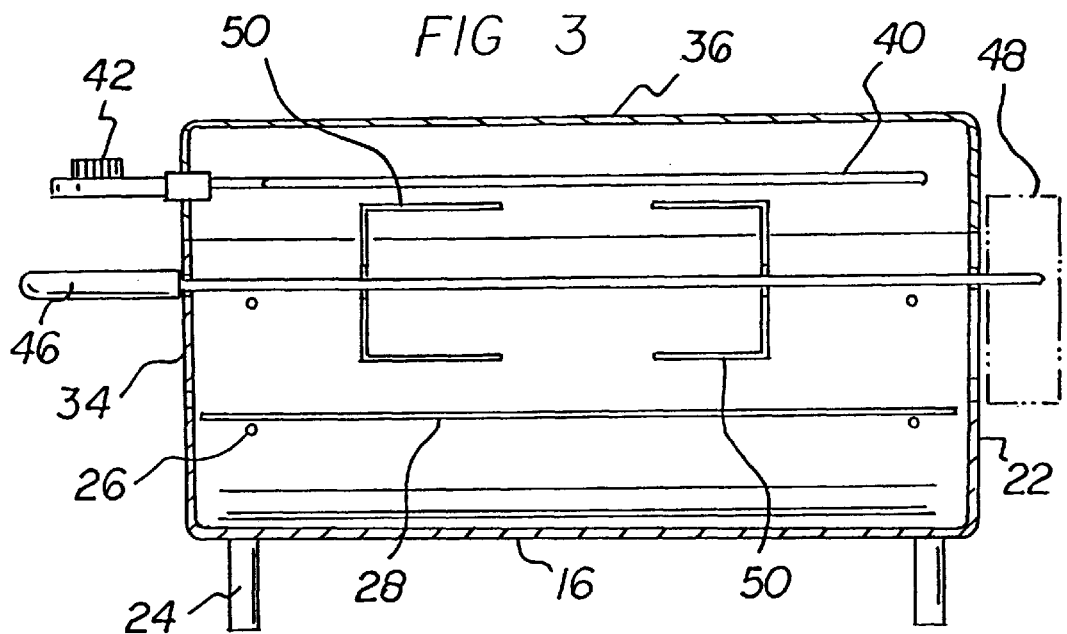
FIG. 3 is a cross-sectional view of the present invention as taken along line 3—3 of FIG. 2.
Figure 4:
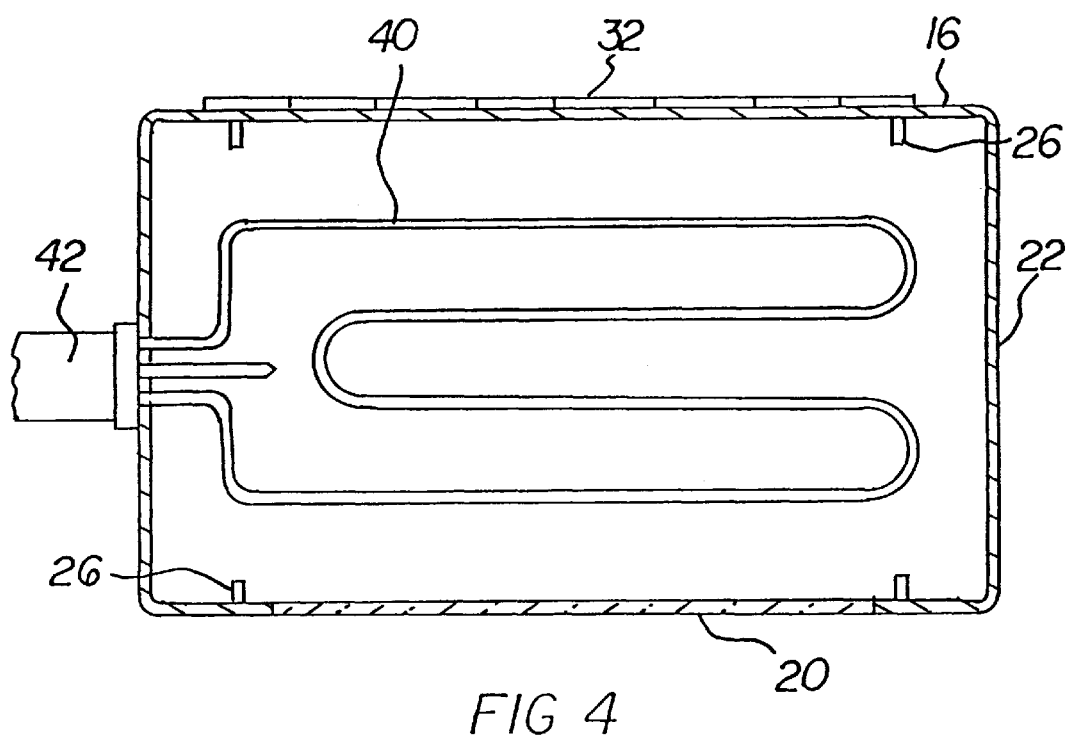
FIG. 4 is a cross-sectional view of the present invention as taken along line 4—4 of FIG. 2.

With reference now to the drawings, and in particular, to FIGS. 1 through 4 thereof, the preferred embodiment of the new and improved portable broiling device embodying the principles and concepts of the present invention and generally designated by the reference number 10 will be described.

Specifically, it will be noted in the various Figures that the device relates to a portable broiling device for providing heat from above food items so as to properly cook the food items. In its broadest context, the device consists of a housing, a dome-shaped lid, a heating element, and a handled skewer. Such components are individually configured and correlated with respect to each other so as to attain the desired objective.

The housing 12 has a generally rectangular configuration. The housing 12 has an open upper end 14, a closed lower end 16, a front wall 18, a rear wall 20, and opposed side walls 22. The housing 12 is preferably constructed from fire and heat resistant material known in the art. The closed lower end 16 has a plurality of legs 24 extending downwardly therefrom. The legs 24 elevate the housing 12 above a recipient surface. Additionally, the legs 24 could be removable from the housing 12. The front wall 18 and the rear wall 20 each have a pair of upper and lower support tabs 26 extending inwardly from inner surfaces thereof to support grilling grates 28 thereon. Additional tabs 26 could be included at varying heights so as to provide more cooking elevations. The front wall 18 has a slotted opening 30 therein upwardly of the closed lower end 16. The slotted opening 30 removably receives a drip pan 32 therein. The opposed side walls 22 each have corresponding upper and lower apertures 34 therethrough.

The dome-shaped lid 36 is hingedly coupled with the open upper end 14 of the housing 12. Alternately, the lid 36 could be completely removed from the housing 12. The lid 36 has a clear window 38 disposed within a forward portion thereof. The clear window 38 allows for the interior of the housing 12 to be viewed without having to raise the lid 36.

The heating element 40 is disposed within an interior surface of the dome-shaped lid 36. The heating element 40 has a temperature control mechanism 42 disposed outwardly with respect to the lid 36. The heating element 40 has a power cord 44 extending outwardly therefrom for coupling with an electrical outlet.

The handled skewer 46 selectively extends between the upper and lower apertures 34 of the opposed side walls 22 of the housing 12. A free end of the skewer 46 has a motor 48 coupled thereto. The motor 48 will have its own power source, preferably battery, so that it can rotate the skewer 46 so that food thereon is evenly cooked. The skewer 46 includes a pair of inwardly extending forks 50 removably coupled thereto. The forks 50 will support food items on the skewer 46 so that the food items can be rotated so as to evenly receive heat from the heating element 40. The forks 50 can be removed from the skewer 46 when not in use.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A portable broiling device for providing heat from above food items so as to properly cook the food items comprising, in combination:

a housing having a generally rectangular configuration, the housing having an open upper end, a closed lower end, a front wall, a rear wall, and opposed side walls, the closed lower end having a plurality of legs extending downwardly therefrom, the front wall and the rear wall each having a pair of upper and lower support tabs extending inwardly from inner surfaces thereof to support grilling grates thereon, the front wall having a slotted opening therein upwardly of the closed lower end, the slotted opening removably receiving a drip pan therein, the opposed side walls each having corresponding upper and lower apertures therethrough;

a dome-shaped lid hingedly coupled with the open upper end of the housing, the lid having a clear window disposed within a forward portion thereof;

a heating element disposed within an interior surface of the dome-shaped lid, the heating element having a temperature control mechanism disposed outwardly with respect to the lid, the heating element having a power cord extending outwardly therefrom for coupling with an electrical outlet;

a handled skewer selectively extending between the upper and lower apertures of the opposed side walls of the housing, a free end of the skewer having a motor coupled thereto, the skewer including a pair of inwardly extending forks removably coupled thereto.

2. A portable broiling device for providing heat from above food items so as to properly cook the food items comprising, in combination:

a housing having a generally rectangular configuration, the housing having an open upper end, a closed lower end, a front wall, a rear wall, and opposed side walls, the front wall and the rear wall each having a pair of upper and lower support tabs extending inwardly from inner surfaces thereof to support grilling grates thereon, the opposed side walls each having corresponding upper and lower apertures therethrough;

a dome-shaped lid hingedly coupled with the open upper end of the housing;

a heating element disposed within an interior surface of the dome-shaped lid;

a handled skewer selectively extending between the upper and lower apertures of the opposed side walls of the housing.

3. The portable broiling device as set forth in claim 2 wherein the closed lower end of the housing has a plurality of legs extending downwardly therefrom.

4. The portable broiling device as set forth in claim 2 wherein the front wall of the housing has a slotted opening therein upwardly of the closed lower end, the slotted opening removably receiving a drip pan therein.

5. The portable broiling device as set forth in claim 2 wherein the lid has a clear window disposed within a forward portion thereof.

6. The portable broiling device as set forth in claim 2 wherein the heating element has a temperature control mechanism disposed outwardly with-respect to the lid.

7. The portable broiling device as set forth in claim 2 wherein a free end of the skewer has a motor coupled thereto.

8. The portable broiling device as set forth in claim 2 wherein the skewer includes a pair of inwardly extending forks removably coupled thereto.

\* \* \* \* \*